Feb. 20, 1951  K. E. LYMAN  2,542,545
WHEEL AND BRAKE ASSEMBLY
Filed July 12, 1947  2 Sheets-Sheet 1
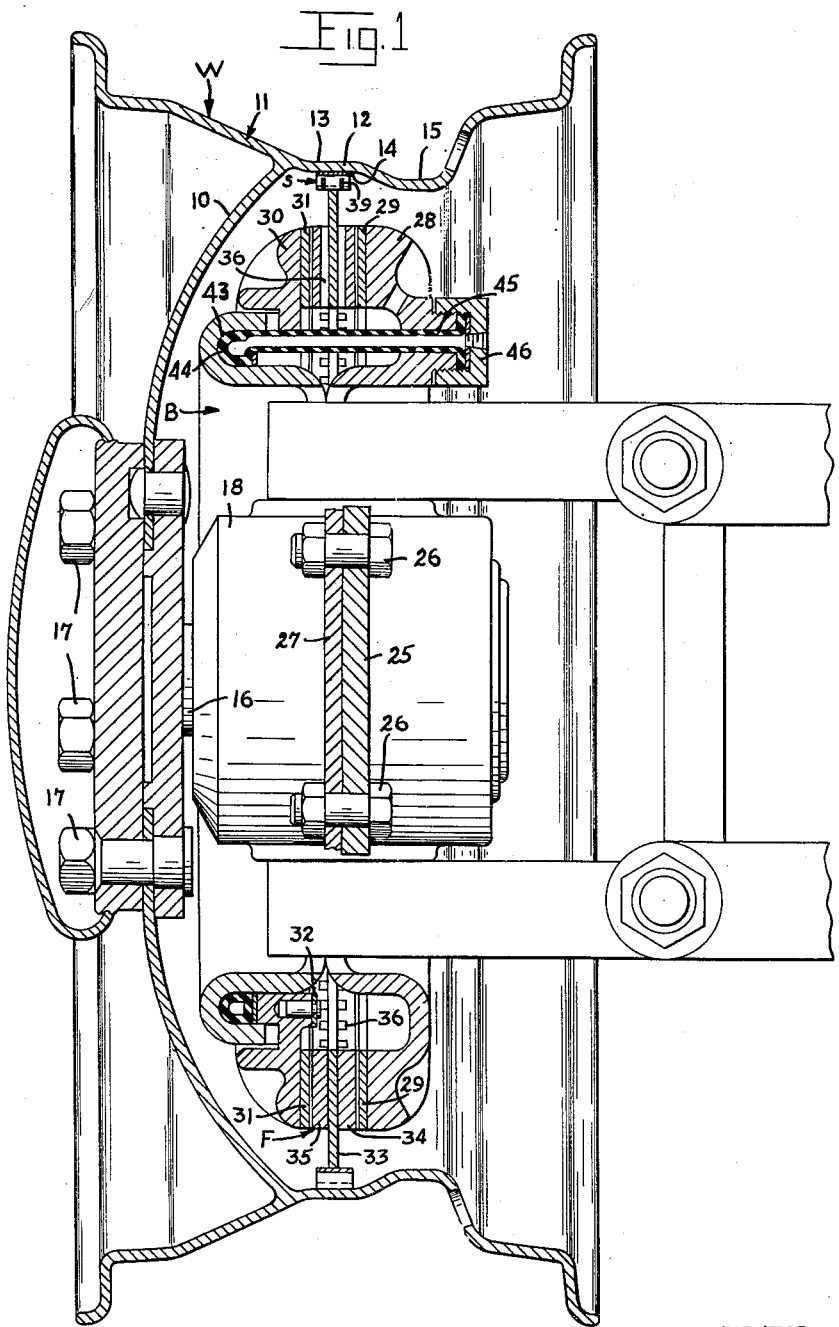
INVENTOR
KENNETH E. LYMAN
BY
Toulmin & Toulmin
ATTORNEYS Feb. 20, 1951     K. E. LYMAN     2,542,545
WHEEL AND BRAKE ASSEMBLY
Filed July 12, 1947     2 Sheets-Sheet 2
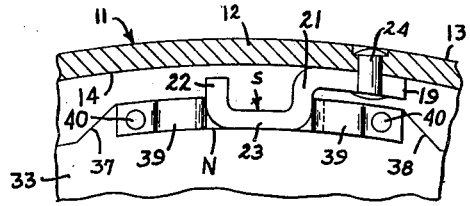
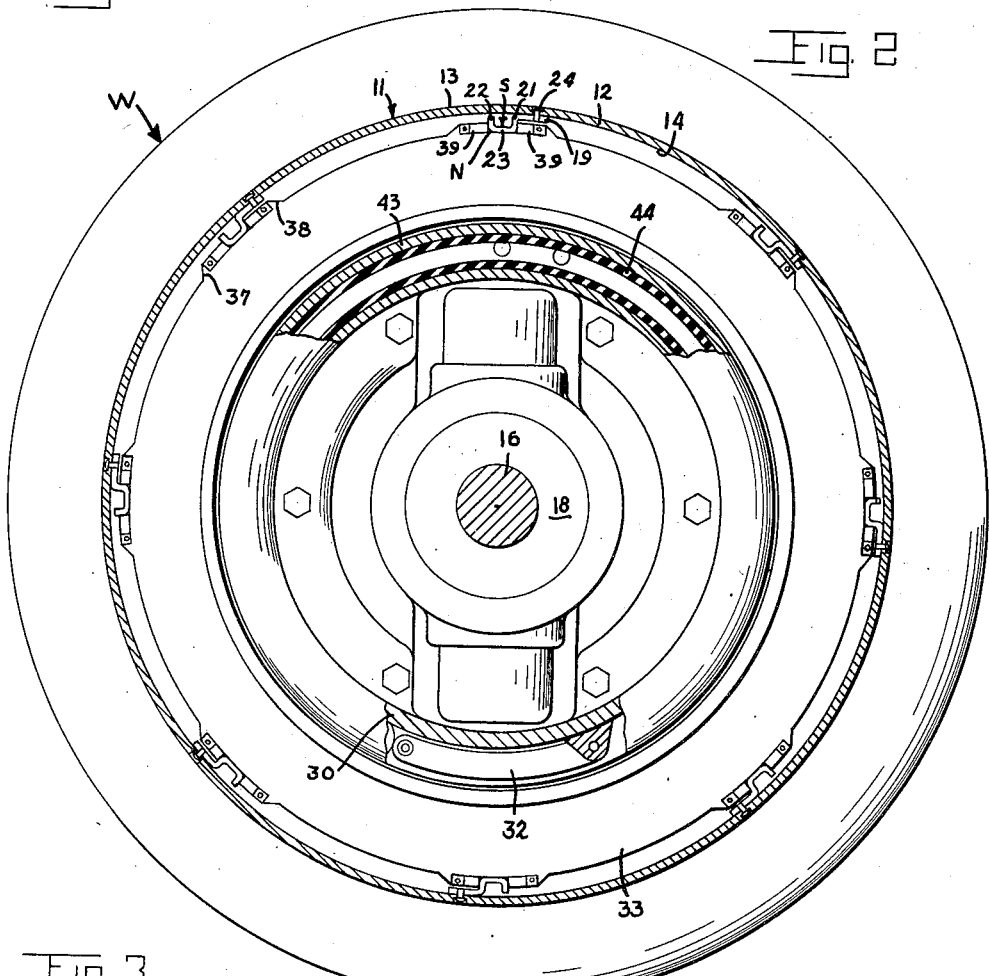
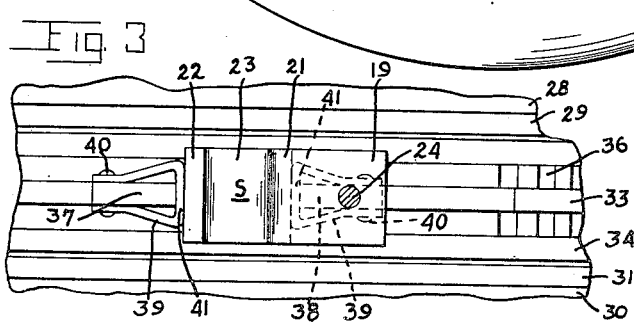
INVENTOR
KENNETH E. LYMAN
BY
Taulmin & Taulmin
ATTORNEYS Patented Feb. 20, 1951

2,542,545

UNITED STATES PATENT OFFICE 2,542,545

WHEEL AND BRAKE ASSEMBLY

Kenneth E. Lyman, Chicago, Ill., assignor to Tucker Corporation, Chicago, Ill., a corporation of Delaware Application July 12, 1947, Serial No. 760,596

3 Claims. (Cl. 188—72)

The present invention relates to automotive brakes and is concerned primarily with a brake of the disc type.

There is a type of wheel now meeting with an appreciable degree of use by the builders of automobiles, and which wheel is identified as including a semi-drop center rim. Such a rim includes an annular depression that is adapted to receive the bead of a tire. The present invention is concerned primarily with a wheel to have a disc brake associated therewith.

A disc brake of the type with which this invention is concerned includes a backing plate that is fixedly mounted on the vehicle frame and is held against both rotative and longitudinal movement. Spaced from and carried by this backing plate is a pressure plate which is held against longitudinal movement, but which is movable axially toward the backing plate. A friction disc is interposed between these pressure and backing plates and appropriate mechanism provided for actuating the pressure plate.

The present invention has in view as its foremost objective the provision of a new and improved driving connection between a wheel having a semi-drop center rim and a friction disc of a brake of the character aforesaid.

More in detail, the invention has an object the provision of a wheel and brake assembly of the character indicated, in which the friction disc carries a plurality of pairs of ears, each pair of which defines a notch, together with means carried by the rim for engaging said notch to establish the driving connection.

In carrying out this idea in a practical embodiment, the friction disc is enlarged at spaced intervals to provide the spaced ears, and the side edges of each notch are preferably provided with liners to thicken the structure at this point. Cooperating with the side edges are spring members that are anchored to the rim and which are adapted to engage with the liners of said notches with a sliding fit.

Various other more detailed objects and advantages of the invention such as arise in carrying out the above noted ideas in a practical embodiment, will in part become apparent and in part be hereinafter stated as the description of the invention proceeds.

The invention, therefore, comprises a combination of a wheel of the semi-drop center type, together with a friction disc brake in which the friction disc carries spaced ears defining notches, while the rim of the wheel carries spring members which are received in said notches to establish the driving relation between the wheel and the disc.

For a full and more complete understanding of the invention, reference may be had to the following description and accompanying drawings, wherein:

Figure 1 is a vertical section through a wheel and brake assembly, embodying the principles of this invention;

Figure 2 is a vertical section taken normal to the showing of Figure 1;

Figure 3 is an enlarged detailed view taken as a section through one of the spring members carried by the rim and the notch in which it is received; and Figure 4 is another enlarged detailed sectional view taken transverse to the showing of Figure 3.

Referring now to the drawings wherein reference characters denote corresponding parts, a wheel is identified in its entirety by the reference character W. This wheel comprises an inner shell 10 and an outer rim 11 which is integral therewith. It is important to note that the rim 11 includes a ring-like section 12 centrally thereof, and which is defined by an outer cylindrical surface 13 and an inner cylindrical surface 14. At one side of this ring 12 the rim is formed with an annular groove 15 which is adapted to receive the bead of a tire.

The inner shell 10 is drivably connected to an axle 16 by the bolt and nut connection shown at 17. The axle 16 is journaled in a bearing block 18.

Referring for the moment more particularly to Figures 3 and 4, it will be noted that a spring member is identified in its entirety by the reference character S.

The member S comprises an end flange 19 to which is integrally joined a U-shaped body portion comprising legs 21 and 22, and a bottom 23 which constitutes an integral connection between the legs 21 and 22. It is evident that the legs 21, 22 and bottom 23 define a U-shaped structure. Upon referring to Figure 3 it will be noted that each of the legs 21 and 22 is substantially smooth or straight, the purpose of which will be later pointed out.

A plurality of the springs S are secured to the inner cylindrical surface 14 that defines the rim part 12 by fastening elements such as the rivets shown at 24. These rivets 24 pass through the flanges 19 to effect the anchorage. It is to be clearly understood that as many of the spring members S may be employed as is necessary to establish a good driving connection with the friction disc in the manner to be hereinafter explained. In the form of the invention shown in Figure 2, eight of these members S are shown. It is to be understood, however, that this is not a limitation on the invention, but is a number taken purely for illustrative purposes.

Formed as a part of the bearing block 18 is a flange 25. Anchored to this flange 25 as by headed bolts 26 is a backing plate designated 27. This backing plate 27 is formed with an outer annular ring-like part 28 having a flat face provided with a friction lining 29. A pressure plate 30 is spaced from the backing plate 25 and has an outer annular ring-like part corresponding to the ring-like part 29. This pressure plate 30 is also provided with a friction lining 31.

As shown in Figure 2, leaf springs 32 may be employed to mount the pressure plate 30 on the backing plate 25. These leaf springs serve to normally maintain the plates in a desired spaced relation.

A friction disc is referred to in its entirety by the reference character F and comprises a central plate 33 which carries on one face an annular ring 34 which is disposed opposite to the lining 29. On its opposite face it carries another annular ring 35 which is disposed opposite to the friction lining 31. Both the rings 34 and 35 are provided with radial air cooling slots 36.

Referring now more particularly to Figures 2 and 3, it will be noted that the plate 33 is extended beyond the rings 34 and 35 to provide a plurality of pairs of ears, with each pair made up of the ears 37 and 38. It is evident that the ears 37 and 38 together define a notch which is designated N.

Carried by the ear 37 is a U-shaped lining 39, the legs of which are secured to the side faces of the notch as by the rivets shown at 40, while the bend of the U-shaped member as identified 41 passes over and aligns with the side edge of the ear 37. This U-shaped connecting member 39 is duplicated on the ear 38. Thus, each of the side edges of the notch N is provided with a reinforcing structure.

In the assembled relation, each of the spring members S is received in the notch N. It is notable that the straight formation of the legs 21 and 22 permits the springs S to be positioned with sliding fit, and they normally remain in this inserted position. However, it is notable that a certain amount of lateral movement on the part of the plate 33 with respect to the wheel W is permitted. This is of importance as will be later pointed out.

A bracket B is carried by the bearing clock 18, and presents a channel 43 opposite to the pressure plate 30. An expansible rubber ring 44 is received in the channel 43 and engages the pressure plate 30. A tubular connection 45 extends to a fitting 46 which may in turn be connected to an appropriate hydraulic system.

*Operation*

With pressure on the hydraulic system relieved, it is evident that the springs 32 maintain the backing plate 27 and pressure plate 30 in spaced relation, and the springs S serve to locate the friction disc in an intermediate or symmetrical position with respect to the notches N. In this position the disc F is spaced from both the pressure and backing plates, and the wheel W is free to rotate without being retarded by any braking effects.

When the brakes are to be applied, pressure on the hydraulic system is increased, whereupon the expansible ring 44 urges the pressure plates 30 into engagement with the disc F and moves the latter over into engagement with the backing plate 27 so that the friction disc F is clamped between the backing plate 27 and pressure plate 30 to achieve the desired braking effects.

It is notable that whenever it is desired to remove the wheel W from the vehicle, such removal is readily accommodated due to the snap fit of the springs S and the notches N of the plate 33. The bowed or curved construction of the legs 22 permits a yielding action that allows the wheel to be removed.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In a wheel and brake assembly of the character described, a wheel having a semi-drop center rim formed with a cylindrical surface centrally thereof, a plurality of spring members carried by said rim at said cylindrical surface and projecting inward therefrom, said spring members being circumferentially compressible, a disc brake including a backing plate, a pressure plate spaced therefrom, a friction disc interposed between said pressure and backing plates, said disc being formed with peripheral notches receiving said spring members with a sliding fit, and means for moving said pressure plate toward said backing plate to clamp said friction disc.

2. A wheel and brake assembly of the character described comprising a semi-drop center rim formed with a cylindrical ring centrally thereof, a plurality of U-shaped spring members anchored by one leg only to the inner surface of said ring, a fixedly mounted backing plate held against rotative and axial movement, a pressure plate spaced from and carried by said backing plate, a friction disc interposed between said pressure and backing plates and formed with a plurality of pairs of outstanding ears with each pair defining a notch, said spring members being received in said notches with a tight sliding fit, and means for actuating said pressure plate to clamp said friction disc between said pressure and backing plates.

3. In a wheel and brake assembly of the character described, means for establishing a detachable driving connection between the friction disc of a brake and a wheel, said means comprising a plurality of pairs of ears outstanding from said friction disc and defining a plurality of notches, a reinforcing member carried by each ear and providing a lining for each side edge of each notch, and a corresponding number of U-shaped spring members received in said notches, each of said spring members having legs of straight cross section to establish a sliding fit between said spring members and said disc.

KENNETH E. LYMAN.

REFERENCES CITED

The following references are of record in the file of this patent:

UNITED STATES PATENTS

| Number | Name | Date |
|---|---|---|
| 1,415,841 | Seitz | May 9, 1922 |
| 1,538,029 | Detlaff | May 19, 1925 |
| 1,740,993 | McDonnell | Dec. 24, 1929 |
| 1,846,080 | Bendix | Feb. 23, 1932 |
| 2,027,135 | Weldon | Jan. 7, 1936 |
| 2,359,516 | Frank | Oct. 3, 1944 |

FOREIGN PATENTS

| Number | Country | Date |
|---|---|---|
| 9,522 | Great Britain | of 1904 |
| 20,338 | Great Britain | of 1907 |
| 412,339 | France | Feb. 8, 1910 |